Figure 1:
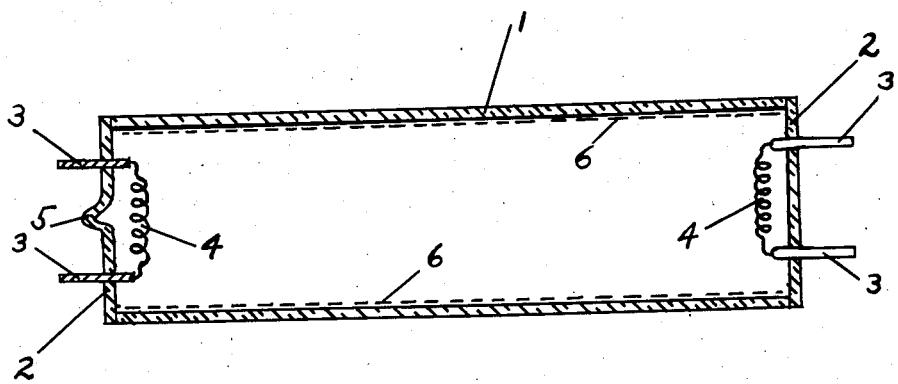

Nov. 28, 1939.   H. W. MYERS   2,181,305
FLUORESCENT LAMP
Filed Dec. 22, 1938

HENRY W. MYERS,
INVENTOR.

BY Laurence Burns,
ATTORNEY.

Patented Nov. 28, 1939

2,181,305

UNITED STATES PATENT OFFICE 2,181,305

FLUORESCENT LAMP

Henry W. Myers, Salem, Mass., assignor to Hygrade Sylvania Corporation, Salem, Mass., a corporation of Massachusetts Application December 22, 1938, Serial No. 247,233

1 Claim. (Cl. 176—122)

This invention relates to electric gaseous discharge lamps, and particularly to such lamps having a coating of luminescent material.

An object of the invention is to provide such a lamp with an extremely smooth and uniform coating of luminescent material on the interior of its envelope.

Another object is to provide for such a lamp, a luminescent coating emitting a white light.

Still another object is to provide a method of applying a smooth and uniform coating of luminescent material to the bulb of such a lamp.

Other objects and advantages will be apparent from the following description, taken in connection with the accompanying drawing, in which:

Figure 1 is a view, partly in section, of a lamp according to the invention.

In the figure, the tubular glass envelope 1, is enclosed by the glass discs 2, through which the lead-in wires 3, are sealed. Electrode 4, comprising a coiled tungsten wire coated with one or more of the alkaline earth oxides, are placed at each end of the envelope and supported by the lead-in wires 3. Other forms of electrode may be used, if desired. The envelope is sealed by the exhaust tube 5, and contains an atmosphere of inert gases at low pressure, and preferably some mercury vapor.

The interior of the tube 1, has a coating 6, of luminescent material according to the invention. A white light approaching daylight has long been the goal of workers in the electric lamp industry; and I have found a combination of materials from which a luminescent coating producing such a white light can be made. Powdered cadmium borate, activated by the presence of a small percentage, less than 1%, of some impurity such as manganese, and mixed in the proper proportions with zinc silicate and calcium or magnesium tungstate, similarly activated, will give such a white light when excited by a gaseous discharge such as would be produced in the lamp desired.

The cadmium borate is preferably present in the mixture in 45 percent by weight, the zinc silicate being then present as 15 per cent by weight, and the magnesium tungstate as 40 per cent.

If the size of the particles in the above mixture is too large, the resulting coating, when applied to the lamp, will be seen to consist of a multitude of green and red spots and dark spots, rather than as a uniform white coating. If, however, the particle size is kept below about 10 microns, that is, if the particles are restricted to those which would pass through a 400-mesh screen, the coating will appear uniformly white.

In carrying out the invention, I start with powders which can pass through a 200-mesh screen, and ball mill them for about 4 hours. I then put about 200 grams of the ball-mill mixture in about 500 cc. of a high viscosity binder. The latter may comprise 4 grams of 1000 second nitrocellulose dissolved in 350 cc. of amyl acetate. The mixture is stirred to form a uniform syrup-like mixture. The tubes to be coated may be placed vertically, and the mixture poured along the inner surface of the glass, down which it will run slowly. The excess is allowed to drain off and the tube is allowed to stand until dried. The tube may then be reversed and the process repeated. After this second pouring the tubes are again allowed to stand until the coating dries. On drying, the amyl acetate evaporates, leaving the luminescent material and the nitrocellulose on the glass in a thin film.

If the coated tubing is allowed to stand too long, say 24 hours, between the drying and the next step of the process, that is, if it is allowed to "over-dry", the thin film of nitrocellulose and luminescent material will tend to shrink in diameter and to separate from the glass to form a thin flexible luminescent tube which can be separated from the glass. If a few drops of n-butyl thallate are added to the mixture before pouring, it will wet the glass better, and the above separation of the film from the glass will not occur.

The use of a binder of very high viscosity is essential if a uniform coating of the proper particle size is desired. If a low viscosity binder, say of one or two seconds viscosity, is used, any larger particles which may be present will not stay in suspension, but will settle out on the glass, before the smaller particles, held in suspension, can deposit.

In place of the zinc silicate previously mentioned a zinc beryllium silicate can be used. Such a silicate may comprise 50% zinc oxide, 12% beryllium oxide, 36% silica dioxide, and 2% manganese fluoride, the latter being an activator. These components may be melted together at about 1400° C., ground fine to the desired particle size and then sintered for about half an hour at 1000° C. The resulting zinc beryllium silicate will have a yellow fluorescence.

One hundred forty grams of this yellow fluorescent zinc beryllium silicate may then be mixed with 170 grams of magnesium tungstate and 65 grams of cadmium borate to give a fluorescent material emitting a white light, such as daylight.

If the amount of zinc oxide in the beryllium silicate is reduced considerably, the silicate will have not a yellow, but a pink coloring, and will not be suitable for the above mixture.

What I claim is:

In an electric gaseous discharge lamp, a glass envelope whose interior is coated with a luminescent material consisting of 65 parts of manganese-activated cadmium borate of a grain size less than 10 microns, 170 parts of manganese-activated magnesium tungstate of a grain size less than 10 microns, and 140 parts of a zinc beryllium silicate of a grain size less than 10 microns, said zinc beryllium silicate initially comprising 50% zinc oxide, 12% beryllium oxide, 36% silica dioxide, and 2% manganese fluoride.

HENRY W. MYERS.